(12) United States Patent
Wright et al.

(10) Patent No.: US 8,980,994 B2
(45) Date of Patent: Mar. 17, 2015

(54) ELASTIC FILM/FIBER FORMULATIONS

(75) Inventors: Kathryn J. Wright, Katy, TX (US); Oomman P. Thomas, Alpharetta, GA (US)

(73) Assignee: Kraton Polymers U.S. LLC, Houston, TX (US)

( * ) Notice: Subject to any disclaimer, the term of this patent is extended or adjusted under 35 U.S.C. 154(b) by 841 days.

(21) Appl. No.: 12/982,037

(22) Filed: Dec. 30, 2010

(65) Prior Publication Data

US 2012/0172516 A1 Jul. 5, 2012

(51) Int. Cl.
*C08L 53/02* (2006.01)
*C08L 9/00* (2006.01)
*C08K 3/00* (2006.01)
*C08F 8/00* (2006.01)

(52) U.S. Cl.
CPC .............. C08L 53/02 (2013.01); *C08L 2205/02* (2013.01)
USPC ........................... 524/505; 525/98; 526/348.6

(58) Field of Classification Search
CPC ....... C08L 53/02; C08L 2205/02; C08L 9/00; C08F 8/00; C08K 3/00
USPC ........................... 524/505; 525/98; 526/348.6
See application file for complete search history.

(56) References Cited

U.S. PATENT DOCUMENTS

| | | | |
|---|---|---|---|
| 5,702,827 | A | 12/1997 | Itoh et al. |
| 6,452,063 | B1 | 9/2002 | Curro et al. |
| 7,700,688 | B2 | 4/2010 | Uzee et al. |
| 7,838,598 | B2 | 11/2010 | Joly et al. |
| 8,173,740 | B2 | 5/2012 | Uzee et al. |
| 8,507,467 | B2 | 8/2013 | Matsui et al. |
| 8,604,129 | B2 | 12/2013 | Thomas |
| 2005/0124709 | A1 | 6/2005 | Krueger et al. |
| 2005/0233249 | A1 | 10/2005 | Muyldermans et al. |
| 2006/0025745 | A1 | 2/2006 | Toro et al. |
| 2006/0155044 | A1 | 7/2006 | Joly et al. |
| 2007/0108078 | A1 | 5/2007 | Molina et al. |
| 2008/0057236 | A1 | 3/2008 | Yamada et al. |
| 2009/0099314 | A1 | 4/2009 | Thomas et al. |
| 2009/0325440 | A1 | 12/2009 | Oomman et al. |
| 2010/0056697 | A1 | 3/2010 | Uzee et al. |
| 2010/0168704 | A1 | 7/2010 | Thomas et al. |

FOREIGN PATENT DOCUMENTS

| | | |
|---|---|---|
| JP | 2002265748 A | 9/2002 |
| WO | 2006071321 A1 | 7/2006 |
| WO | WO2008/063807 * | 5/2008 |

OTHER PUBLICATIONS

International Search Report for PCT/US2011/048784, filed Nov. 10, 2011.
Donker, Chretien, "A New Generation of Hot Melt Tape Formulations, Using blends of SIBS and SBS Bock Copolymers and New Hydrocarbon Tackifying Resins," paper presented at 3rd AFERA Technical Conference, Apr. 5-7, 2006, pp. 1-7.
Supplementary European Search Report, dated Jun. 12, 2014.
State Intellectual Property Office of the People's Republic of China Search Report dated Aug. 7, 2014.

* cited by examiner

*Primary Examiner* — James J Seidleck
*Assistant Examiner* — Deve E Valdez
(74) *Attorney, Agent, or Firm* — Clements Bernard PLLC; Michael A. Masse

(57) ABSTRACT

The present invention relates to elastic film formulations that have surprisingly high tensile strengths in addition to good viscosity stability and are based on a blend of two styrene block copolymers, namely, styrene-isoprene/butadiene-styrene and styrene-butadiene-styrene. The blend of these two styrenic block copolymers in the range set forth and described herein yield high tensile strength that is at least 50% higher than that of the prior art based styrenic block copolymers and have good viscosity stability. Moreover, the present invention relates to a blend of two different styrene block copolymers that can be made by dry blending the block copolymer components. Then the blend can be extruded into uncross-linked film, fiber, or plurality of fibers.

8 Claims, 1 Drawing Sheet

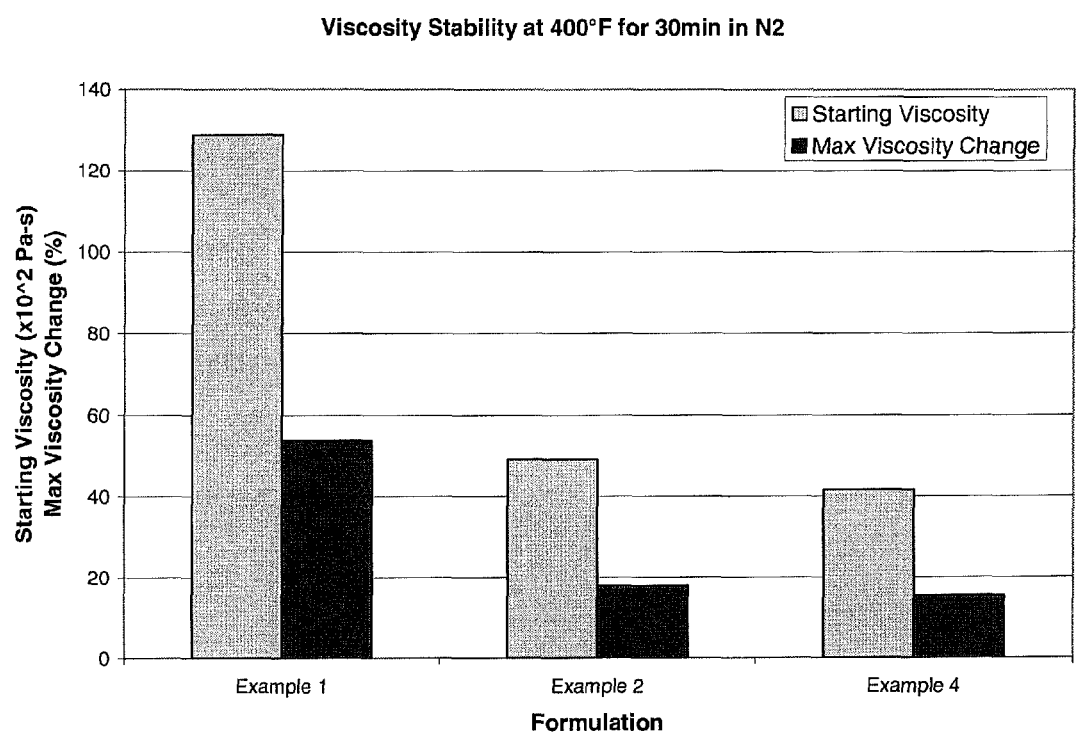

ELASTIC FILM/FIBER FORMULATIONS

FIELD OF THE INVENTION

The present invention relates to elastic film/fiber formulations that have surprisingly high tensile strengths and good viscosity stability, and are based on a blend of two styrene block copolymers (SBC), namely, styrene-isoprene/butadiene-styrene (S-I/B-S) and styrene-butadiene-styrene (SBS). The state of the art SBC blend is a combination of SBS and styrene-isoprene-styrene (SIS). This blend has good tensile strength, comparable to the present invention, however the state of the art blend has very poor viscosity stability. The elastic blend of the present invention (SBS and S-I/B-S) copolymers in the range set forth and described herein, yield formulations with tensile strength similar to or superior to the prior art based styrenic block copolymers. Further, the present invention has great viscosity stability, unlike the state of the art blend. Moreover, the present invention relates to a blend of two different styrene block copolymers that can be simply made by dry blending and do not require a pre-compounding step. Pre-compounding via melt blending the block copolymer components may also be utilized before conversion into the final form. Then the blend can be extruded into film, fiber, or a plurality of fibers.

BACKGROUND OF THE INVENTION

Styrene-butadiene-styrene and styrene-isoprene-styrene blends have been routinely used as a base for elastic film formulations used in personal care applications. It is noted that blends of SBS and SIS exhibit tensile strength properties of >1600 psi while maintaining good hysteresis at both 100% and 300%, with recovered energy of greater than 70% and a permanent set less than 10% for 100% hysteresis. After 300% hysteresis, a recovered energy of greater than 60% and a permanent set less than 20% is embodied by the present invention.

It is known that SBS block copolymers increase in viscosity during melt processing. Likewise, it is known that SIS block copolymers decrease in viscosity during melt processing. With the state of the art formulations comprising a blend of SBS and SIS, undesirable gel formation generally results, due to degradation of the SBS copolymers, caused by cross linking of the butadiene. Gel formation produces unsightly and inconsistent film defects. Isoprene degradation can also occur and when it does chain scission results and the isoprene fragments thereby reduce the viscosity. Thus with the state of the art composition it is always a balance to have just the right amount of SBS and SIS such that the gel formation is balanced against the fragmentation and the viscosity remains more consistent. This balance is extremely difficult to achieve because the rates of degradation of SBS and SIS are not the same.

It is known through discovery by the present inventor that random S-I/B-S neat copolymers have excellent viscosity stability because the butadiene does not degrade as easily as the butadiene in SBS copolymer. However, copolymers of S-I/B-S have low tensile strength.

What is sought in the marketplace, in the art of elastic film and fiber formulations, is an SBC which has sufficient tensile properties in addition to good viscosity stability. The present invention completely satisfies these desires of the marketplace.

SUMMARY OF THE INVENTION

The present invention is directed to a styrenic block copolymer composition suitable for elastic film or fiber. The composition comprises: 1) an SBC, and 2) optional additives. The elastomeric composition contains from about 50 wt. % to about 75 wt. % of SBS copolymer, and from about 20 wt. % to about 50 wt. % of S-I/B-S random copolymer. The melt flow rate each polymer is about 5 g or greater, per 10 min. when measured at 200° C. with 5 kg weight, measured according to ASTM D-1238. The composition optionally includes small amounts of antioxidant, carbon radical scavenger, and other components. The elastomeric composition has a butadiene content of at least 45 wt. %, and preferably at least 47 wt. %, while the composition maintains a viscosity (measured in units of Pa-s.) within 20% of the initial value after 30 minutes of continuous exposure to nitrogen at 400° F. While all the optional additives may be 0.0 wt. %, preferably, all the optional additives comprise from about a 0.5 wt. % to 12 wt. % (including all percentages between 0.0 wt. % and 12 wt. %) of the composition, and more preferably from about 0.5 wt. % to 1.5 wt. %, while the SBC make up the other remainder of the composition. The total components of the composition total 100% by wt.

The composition of the present invention has a tensile strength of at least 1600 psi measured according to the technique described in the Examples. Moreover, it has a recovered energy of at least 70% and permanent set of less than 10%, at 100% hysteresis. Likewise, at 300% hysteresis, the recovered energy is at least 70% while the permanent set is less than 20%.

BRIEF DESCRIPTION OF THE DRAWING

The FIGURE is a bar chart of initial complex viscosity in Pa-s and viscosity stability measured in a parallel plate rheometer at 0.1 rad/s and 10% strain at 400° F. after 30 minutes in a nitrogen enriched environment. A gap setting of 1 mm was used for these measurements. The viscosity stability is expressed as the maximum percent change over the 30 minute period. The FIGURE shows results for Example 1 which is representative of the prior art and is the blend SBS and SIS, Example 2 which is S-I/B-S, and Example 4 which is the present invention of a blend of SBS and S-I/B-S.

DESCRIPTION OF THE PREFERRED EMBODIMENTS

The present invention is an elastic composition comprising two components, namely: 1) a mixture of two styrenic block copolymers, and 2) other additives including antioxidants, carbon radical scavengers and other inert components. With respect to the mixture of the elastic styrenic block copolymers, the mixture comprises SBS block copolymer and S-I/B-S random block copolymer. Specifically, the elastomeric composition contains from about 50 wt. % to about 75 wt. % (including all wt. percentages between 50 and 75 wt. %) of SBS copolymer, and from about 20 wt. % to about 50 wt. % (including all percentages between 20 and 50 wt. %) of S-I/B-S random copolymer. In the case of the styrene-isoprene/butadiene-styrene block copolymer, the mid block would be a random block copolymer. These block copolymers may be linear tri-block copolymers where the block copolymers have the form S-B-S and S-I/B-S. They may be prepared sequentially, where each block is formed via polymerization and then the next block is formed, as is well known to those in the art. Likewise, both of these polymers may also be coupled copolymers wherein the SBS block copolymer has the form of (S-B)nX where n is the number of arms and is 2 or more, and X is a coupling agent residue. Likewise the S-I/B-S block copolymer may take the form of (S-I/B)nX where n is the number of arms and is 2 or more, and X is a coupling agent residue. Therefore these block copolymers of various architectures can be combined as part of the present invention. The melt flow rates for the polymers of the present invention are about 5 g polymer/10 minutes, or greater, when measured at 200° C. and 5 kg weight according to ASTM D-1238.

It is required that the styrenic block copolymer mixture (SBS and S-I/B-S) has a butadiene content greater than or equal to 45 wt. % of the composition, and preferably at least 47 wt. %, for economic benefit. This means that the rubbery elastomeric or midblock portion must be the dominate part of the styrenic block copolymer mixture. These two block copolymers may be melt blended where each component is melted and then blended, and extruded into a film or fiber, for example, or the two copolymers may be dry blended such that a film or fiber producer can introduce the dry blend into an extruder, melt the components, and extrude a film or fiber of sound integrity as is known in the art.

Optionally, the process could also comprise melt extruding the components together, cut the extrudate into pellet form, as is known in the art, and sell the blended pellet product to film or fiber producers, who would then re-melt the product and extrude it into film or fiber form. Regardless of which process is employed to make the film or fiber, the film or fiber can be crossed-linked or uncross-linked. This invention is only concerned with uncross-linked film or fiber. The composition maintains a viscosity (measured in units of Pa-s.) within 20% of the initial value after 30 minutes of continuous exposure to nitrogen at 400° F. The composition of the present invention has a tensile strength of at least 1600 psi and it has a recovered energy of at least 70% and permanent set of less than 10%, at 100% hysteresis. Likewise, at 300% hysteresis, the recovered energy is at least 70% while the permanent set is less than 20%.

Preferred SBS block copolymers may be obtained from Kraton Polymers LLC in Houston, Tex. as the Kraton D polymer family. Specifically, a suitable coupled copolymer of SBS may be D1102. A suitable linear SBS copolymer may be D1153. Other suitable SBS block copolymers are also available from Dexco under the tradename Vector, for example Vector 8508. Still other suitable SBS block copolymers are also available from Enichem, under the tradename Europrene Sol-T such as 166 as well as Kosyn KTR 201 from Korea Kumho Petrochemical Company. Still other suitable SBS block copolymers may be sourced from Taiwan Synthetic Rubber Company as Taipol 3202.

Suitable S-I/B-S linear and/or coupled copolymers would be D1170 or D1171, respectively, obtained from Kraton Polymers LLC. Quadblock copolymers may also be utilized under the present invention (available from Dexco Polymers LP; see PCT International Patent Application Number WO 2008/063807 A1 by Uzee and Myers).

Also, blended into the compositions of the present inventions are various optional additives. Primary antioxidants, secondary antioxidants, and carbon radical scavengers are generally desired components in the present invention, but are not mandatory. Most antioxidants fall into the category of primary or secondary antioxidants and have different functions due to different chemical structures. A primary antioxidant is typically a hindered phenol or arylamines. Primary antioxidants scavenge alkoxy radicals and peroxy radicals. Many primary antioxidants that are compatible with styrenic block copolymers may be incorporated into the compositions of the present invention. Primary antioxidants sold under the trade name, Irganox from BASF may be suitable, such as 1010, 1076, and 1330.

Secondary antioxidants may also be used along with the Primary antioxidants. Secondary antioxidants are typically phosphites and thiosynergists. Secondary antioxidants scavenge hydroperoxides which are generated during the autoxidation cycle of a polymer exposed to heat and oxygen. Various compositions sold under the trade name, Irgafos, may be suitable and are likewise manufactured by BASF. Irgafos 168 and the like may be suitable for the present invention.

Carbon radical scavengers are considered to be a third category of antioxidant. Additionally, carbon radical scavengers for example under the tradename—Sumilizer, produced by Sumitomo Chemical may be used. Sumilizer GS is used in the Examples.

Other optional additives such as UV absorbers, colorants, and pigments, tackifying resins, paraffinic oils, low-density polyethylene, polystyrene, and/or talc mineral filler may also be incorporated. The polystyrene is crystal clear and is general purpose polystyrene—such as clear, homo-polystyrene. All the optional components may be present at a combined level of about 12 wt. % or less without distracting from the spirit of the present invention.

EXAMPLES

In the examples, the material was manufactured in a 25 mm twin screw extruder. The material was processed with a temperature profile of 266-375 degrees Fahrenheit, at a screw speed of about 300 rpm, generating a melt temperature ranging from 380-400° F. The manufactured product was converted to a 3 mil thick film using a single screw extruder with a temperature profile of 350-400° F., at a screw speed of about 50 rpm, generating a melt temperature of about 400° F. The resulting elastic films were collected on a chill roll set to about 41° F. Several properties of the compositions of the present invention are tested.

Melt flow rate is measured according to ASTM D-1238 at 200° C. with a 5 kg weight and the units from this measurement are in terms of grams of polymer per 10 minutes for the S-B-S or S-I/B-S, or in terms of grams of elastomeric composition per 10 min. for the composition, (it is the MFR of the composition that was measured in Table 1). Thus the melt flow rate of both S-B-S, S-I/B-S, and the elastomeric compositions are measured according to ASTM D-1238 (test used in June of 2010). D1102 (SBS employed in the examples) has a melt flow rate of 14 g/10 min. when measured at 200° C. with 5 kg weight. D1171 (S-I/B-S employed in the examples) has a melt flow rate of 10 g/10 min. when measured at 200° C. with 5 kg weight. For the SBS and S-I/B-S polymers employed in the examples and in the present invention, the MFR are about 5 g polymer/10 minutes, or greater, when measured at 200° C. and 5 kg weight according to ASTM D-1238.

The films were tested for tensile and hysteresis properties. Tensile tests were performed using a dogbone configuration with a 1 inch gage length and a crosshead speed of 2 in/min. Hysteresis properties were tested to determine the elastic recovery characteristics of the article. During the hysteresis experiment, a ½ inch wide and 5 inch long strip is cut from the elastic film and elongated to either 100%, 300%, or 400% strain based on a 3 inch gage length at a crosshead speed of 10 in/min. After reaching the maximum strain, the specimen is immediately returned to 0 load also at a crosshead speed of 10 in/min. Following this cycle, the permanent set is calculated as the % strain at 0 load. Recovered energy is calculated at the area under the loading curve minus the area under the unloading curve divided by the area under the loading curve and is expressed in %. A perfect elastomer would exhibit a permanent set of 0% and a recovered energy of 100%. For the present invention, 100% hysteresis and 300% hysteresis has been tested for the recovered energy and the permanent set.

Lastly, complex viscosity (reported in Pa-s) and viscosity stability have been measured in a parallel plate rheometer at 0.1 rad/s and 10% strain at 400° F. after 30 minutes in a nitrogen enriched environment. A gap setting of 1 mm was used for these measurements. The viscosity stability is expressed as the maximum percent change over the 30 minute period.

Example 1

Example 1 is a comparative example using the state of the art composition in which 59 wt. % of a styrene-butadiene-styrene coupled copolymer (Kraton D1102) and 40 wt. % of styrene-isoprene-styrene linear copolymer (Kraton D1114) were blended with 0.25 wt. % Irganox 1010, 0.25 wt. % Irgafos 168, and 0.50 wt. % Sumilizer GS. Thus the total weight of the components make up 100 wt. %. In this formulation, it is noted that the % butadiene is 42.2%. At this level of butadiene in the formulation, the viscosity is not stable and has a maximum % change of 54%. When processed on large scale commercial equipment, this viscosity instability results in gel formation which causes poor film or fibers as a result. The results of testing this composition are set forth in Table 1.

Example 2

Example 2 is a comparative example using S-I/B-S. This composition is 99 wt. % of D1171 and comprises the same amount of Irganox 1010, Irgafos 168, and Sumilizer GS as set forth in Example 1, thus the components in this composition total 100 wt. %. The butadiene in this formulation is 23.8%. It is difficult to incorporate a substantially higher butadiene percent while maintaining stable melt viscosity. While this composition will yield no gel formation in large scale film or fiber production, the tensile strength is almost half of that of Example 1. The results of testing the composition in Example 2 are set forth in Table 1.

Example 3

Example 3 of the present invention comprises 59 wt. % of a coupled SBS block copolymer (D1102) and 40 wt. % of S-I/B-S of D1171. The additives are the exact same trade names and amounts employed in Example 1. The percent butadiene is 51.8% although this composition has a higher percent butadiene in the formulation, it results in a stable viscosity profile similar to that of Example 2. In addition, this formulation also exhibits an 85% increase in tensile strength as compared to Example 2. The results of testing this block copolymer composition are set forth in Table 1.

Example 4

Example 4 is a reproduction of Example 3, except the components were first dry blended, and then melt extruded into a film and tested where the test results are set forth in Table 1. In Example 3, the components were blended together in melt form in an extruder. Of course, in Example 4 the percent butadiene in the formulation remains the same as in Example 3.

Example 5

In Example 5, the amounts of SBS and S-I/B-S were reversed when compared to Examples 3 and 4. Thus Example 5 is a comparative example in which 40 wt. % is a coupled SBS block copolymer D1102, and 59 wt. % of S-I/B-S is employed using D1171. The additive package for this comparative composition is the same as set forth in Example 1. This composition results in tensile strength less than the desired level of 1600 psi. The results are reported in Table 1.

Examples 6 & 7

Examples 6 and 7 further demonstrate the present invention and comprise 71 and 51 wt. %, respectively, of a coupled SBS block copolymer (D1102) and 28 and 48 wt. % of S-I/B-S of D1171, respectively. The additives are the exact same trade names and amounts employed in Example 1. The percent butadiene is 57.6% and 48.0% and results in a stable viscosity profile similar to that of Example 2. In addition, these formulations also exhibit tensile strengths >1600 psi and 300% hysteresis recovered energy of 70% and permanent set of 20%. The results of testing this block copolymer composition are set forth in Table 1.

Example 8

Example 8 further demonstrate the present invention and comprises 66 wt. % of a coupled SBS block copolymer (D1102) and 23 wt. % of S-I/B-S of D1171, and 10% of a general purpose crystal polystyrene (EA3710 which has an 18 g/10 min when measured at 200° C. with 5 kg weight MFR, polystyrene available from AmericasStyrenics). The additives are the exact same trade names and amounts employed in Example 1. The percent butadiene is 52.8% and results in a gel free film with very high tensile strength >1600 psi and 300% hysteresis recovered energy of 80% and permanent set of 15%. The results of testing this elastomeric composition are set forth in Table 1.

In viewing the drawing, it is noted that the traditional composition of Example 1 has a very high initial viscosity and a maximum viscosity change of 54%. Thus the stability of the viscosity in Example 1 is very poor. Comparative Example 2, wherein the styrenic block copolymer is S-I/B-S, has a substantially lower initial viscosity than that of Example 1, which makes processing easier and it is also much more stable than Example 1 with a maximum change of only 18%. Lastly, the initial viscosity of Example 3, in which the combination of linear block copolymer SBS and linear block copolymer S-I/B-S, is similar to that of Example 2 while maintaining similar viscosity stability with a maximum change of only 15%. Thus with respect to the present invention, and looking only at viscosity stability, both Example 2 and Example 3 would be desirable. However, only Example 3 results in the combination of desired viscosity stability and high tensile strength attributes. Similarly, Examples 4, and 6-8 also show the desired combination of tensile strength >1600 psi and maximum viscosity change of <25% as demonstrated in Table 1.

TABLE 1

| Formulation | Example 1 | Example 2 | Example 3 | Example 4 | Example 5 | Example 6 | Example 7 | Example 8 |
|---|---|---|---|---|---|---|---|---|
| D1102 | 59.00% | | 59.00% | 59.00% | 40.00% | 71.0% | 51.0% | 66.0% |
| D1114 | 40.00% | | | | | | | |
| D1171 | | 99.00% | 40.00% | 40.00% | 59.00% | 28.0 | 48.0 | 23.0% |

TABLE 1-continued

| Formulation | Example 1 | Example 2 | Example 3 | Example 4 | Example 5 | Example 6 | Example 7 | Example 8 |
|---|---|---|---|---|---|---|---|---|
| Polystyrene EA3710 | | | | | | | | 10.0% |
| Irganox 1010 | 0.25% | 0.25% | 0.25% | 0.25% | 0.25% | 0.25% | 0.25% | 0.25% |
| Irgafos 168 | 0.25% | 0.25% | 0.25% | 0.25% | 0.25% | 0.25% | 0.25% | 0.25% |
| Sumilizer GS | 0.50% | 0.50% | 0.50% | 0.50% | 0.50% | 0.50% | 0.50% | 0.50% |
| Total | 100.00% | 100.00% | 100.00% | 100.00% | 100.00% | 100.00% | 100.00% | 100.00% |
| % Bd in formulation | 42.2% | </=35.0% | 51.8% | 51.8% | 42.8% | 57.6% | 48.0% | 52.8% |
| MFR @ 170° C./5 kg | 5.0/5.01 | 3.2/3.4 | 4.8 | n.m. | 4.8 | 5.2 | 5.2 | 4.0 |
| Tensile Properties CD | | | | | | | | |
| Tensile Strength | 1980 | 1120 | 2080 | 2300 | 1260 | 3330 | 1690 | 3870 |
| Elongation @ break | 1090 | 1260 | 1320 | 1300 | 1310 | 1270 | 1190 | 1240 |
| 100% Modulus | 150 | 100 | 190 | 180 | 130 | 200 | 160 | 230 |
| 300% Modulus | 240 | 150 | 260 | 260 | 200 | 310 | 260 | 370 |
| 100% Hysteresis CD | | | | | | | | |
| Recovered Energy | 80 | 85 | 75 | 80 | 75 | n.m. | n.m. | 80 |
| Permanent Set | 5 | 6 | 9 | 8 | 10 | n.m. | n.m. | 8 |
| Stress @ 100% | 160 | 80 | 190 | 180 | 130 | n.m. | n.m. | 180 |
| 300% Hysteresis CD | | | | | | | | |
| Recovered Energy | 80 | 80 | 70 | 80 | n.m. | 70 | 70 | 80 |
| Permanent Set | 14 | 16 | 16 | 18 | n.m. | 20 | 20 | 15 |
| Stress @ 100% | 300 | 120 | 230 | 240 | n.m. | 260 | 260 | 260 |
| Complex Viscosity @ 400° F./30 min Max Change, % | 54 | 18 | 15 | | | 12 | 15 | n.m. | n.m. = not measured

The (prior) state of the art composition is Example 1, a comparative example. It has great tensile strength but very poor viscosity stability. Comparative Example 2 by comparison has very good viscosity stability, but very poor tensile strength. Examples 3, 4, 6 & 7 (examples of the present invention) have tensile strength similar to or slightly better than those of the state of the art composition in Example 1, and they have very good viscosity stability, and they have a percent butadiene equal to or greater than 48 wt. % in the composition. Lastly, Comparative Example 5, which was not tested for viscosity stability, has poor tensile strength not much better than Example 2. Consequently, the difference between the styrenic block copolymer formulations of Examples 3, 4, 6, & 7 versus Example 5 indicate that the SBS coupled block copolymer should be at least about 50 wt. % of the composition.

Thus it is apparent that there has been provided, in accordance with the invention, an article that fully satisfies the objects, aims, and advantages set forth herein. While the invention has been described in conjunction with specific embodiments thereof, it is evident that many alternatives, modifications, and variations will be apparent to those skilled in the art in light of the foregoing description. Accordingly, the invention is intended to embrace all such alternatives, and modifications and variations as fall within the spirit and broad scope of the intended claims.

What is claimed is:

1. An elastomeric composition, for elastic film or fiber, comprising:
    a styrenic block copolymer containing from about 50 wt. % to about 75 wt. % of styrene-butadiene-styrene block copolymer, and
    from about 20 wt. % to about 50 wt. % of styrene-isoprene/butadiene-styrene block copolymer, where the melt flow rates of the individual S-B-S and S-I/B-S polymers are about 5 g polymer per 10 minutes, or greater, when measured at 200° C. and 5 kg weight according to ASTM D1238; wherein said styrenic block copolymer has a butadiene content of at least about 45 wt. %,
    said composition optionally further including:
    0.0 to about 0.5 wt. % of a primary antioxidant;
    0.0 to about 0.5 wt. % of a secondary antioxidant; and
    0 to about 0.8 wt. % carbon radical scavenger;
    wherein the total wt. % of all components is 100%, while said styrenic block copolymer composition exhibits a viscosity change of <25% after 30 minutes continuous exposure to nitrogen at 400° F.

2. The elastomeric composition of claim 1, wherein said styrenic block copolymer composition has a tensile strength of at least 1600 psi.

3. The elastomeric composition of claim 1, wherein said primary antioxidant is present in a range from 0.01 to 0.4 wt. %.

4. The elastomeric composition of claim 1, wherein said secondary antioxidant is present in a range from 0.01 to 0.4 wt. %.

5. The elastomeric composition of claim 1, wherein the recovered energy is at least 70% after 100% hysteresis measurement.

6. The elastomeric composition of claim 1, wherein the permanent set is less than 10% after 100% hysteresis measurement.

7. The elastomeric composition of claim 1, wherein the recovered energy is at least 60% after 300% hysteresis measurement.

8. The elastomeric composition of claim 1, wherein the permanent set is less than 20% at 300% hysteresis.

* * * * *

UNITED STATES PATENT AND TRADEMARK OFFICE
CERTIFICATE OF CORRECTION

| | | |
|---|---|---|
| PATENT NO. | : 8,980,994 B2 | Page 1 of 1 |
| APPLICATION NO. | : 12/982037 | |
| DATED | : March 17, 2015 | |
| INVENTOR(S) | : Kathryn J. Wright and Oomman P. Thomas | |

It is certified that error appears in the above-identified patent and that said Letters Patent is hereby corrected as shown below:

In the Claims

Column 8, line 40, Claim 1, please delete "wherein said styrenic block copolymer has a butadiene conent of at least about 45 wt. %,".

Please insert claim 2 as follows: --2. The elastomeric composition of claim 1, wherein the said styrenic block copolymer has a butadiene content of at least about 45 wt. %.--.

Signed and Sealed this
Eighth Day of September, 2015

Michelle K. Lee
*Director of the United States Patent and Trademark Office*